(12) United States Patent
Hayashi

(10) Patent No.: US 6,198,587 B1
(45) Date of Patent: *Mar. 6, 2001

(54) RECORDING INFORMATION REPRODUCING APPARATUS FOR INCREASING AN AMPLITUDE OF A HIGH FREQUENCY COMPONENT OF THE REPRODUCED SIGNAL

(75) Inventor: Hideki Hayashi, Tsurugashima (JP)

(73) Assignee: Pioneer Electronic Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/680,985

(22) Filed: Jul. 16, 1996

(30) Foreign Application Priority Data

Jul. 28, 1995 (JP) ............................................. 7-193294

(51) Int. Cl.[7] .............................. G11B 5/035; G11B 7/00
(52) U.S. Cl. ......................................... 360/65; 369/124.13
(58) Field of Search ..................... 360/65, 46, 27; 369/57, 13, 58, 124.13; 371/43.4

(56) References Cited

U.S. PATENT DOCUMENTS

| 4,110,798 | * | 8/1978 | Miller et al. ............................ 360/65 |
| 4,531,165 | * | 7/1985 | Sonu et al. ............................. 360/65 |
| 4,656,533 | * | 4/1987 | Sakai et al. ............................ 360/46 |
| 5,132,988 | * | 7/1992 | Fisher et al. ....................... 360/65 X |
| 5,280,394 | * | 1/1994 | Murabayashi et al. ................ 360/27 |
| 5,430,661 | * | 7/1995 | Fisher et al. ....................... 360/65 X |
| 5,488,591 | * | 1/1996 | Kobayashi et al. ..................... 369/13 |
| 5,543,978 | * | 8/1996 | Park ........................................ 360/65 |
| 5,588,011 | * | 12/1996 | Riggle ................................ 360/46 X |
| 5,703,852 | * | 12/1997 | Kumagai ................................ 360/27 |

* cited by examiner

*Primary Examiner*—W. Chris Kim
(74) *Attorney, Agent, or Firm*—Finnegan, Henderson, Farabow, Garrett & Dunner, L.L.P.

(57) ABSTRACT

A recording information reproducing apparatus which can precisely reproduce a digital signal from any one of a plurality of kinds of recording disks of different recording densities. A recording density of a recording medium as a reproduction target is detected and an amplitude of a high frequency component of a read signal read out from the recording medium is increased by a gain according to the detected recording density.

9 Claims, 7 Drawing Sheets

| TYPE OF SD DISK | RECORDING DENSITY | EQUALIZATION COEFFICIENT |
|---|---|---|
| SD – 5 | 5.0 GB / SIDE | $K_4$ |
| SD – 10 | | |
| SD – 9 | 4.5 GB / LAYER | $K_3$ |
| SD – 18 | | |
| SD – R | 4.0 GB / SIDE OR LESS | $K_2$ |
| SD – RAM | 2.6 GB / SIDE | $K_1$ |

$K_4 > K_3 > K_2 > K_1$

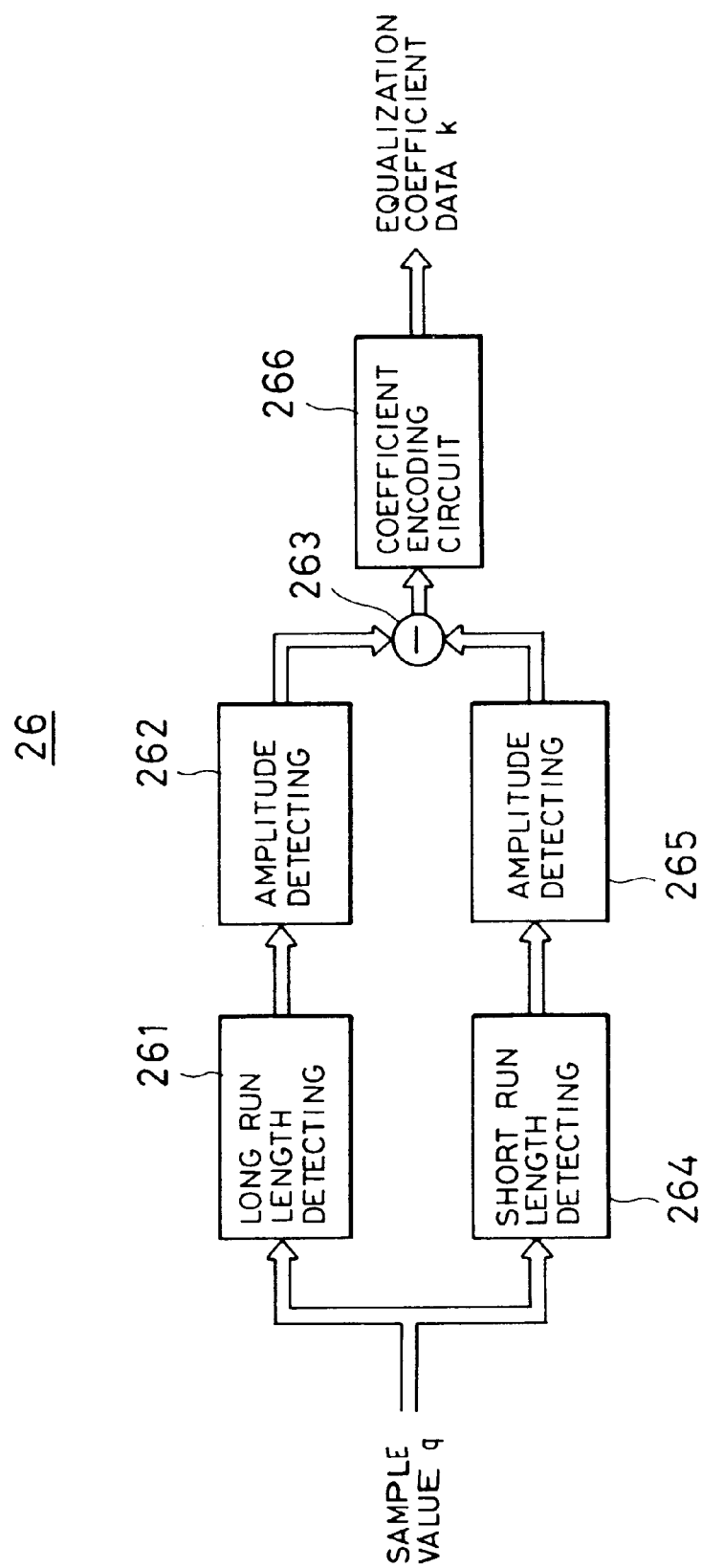

RECORDING INFORMATION REPRODUCING APPARATUS FOR INCREASING AN AMPLITUDE OF A HIGH FREQUENCY COMPONENT OF THE REPRODUCED SIGNAL

BACKGROUND OF THE INVENTION

1. Field of the Invention

The invention relates to a recording information reproducing apparatus for reproducing recording information from a recording medium.

2. Description of Background Information

An example of the construction of a CD (compact disk) player, as a recording information reproducing apparatus, is schematically illustrated in FIG. 1.

As shown in FIG. 1, a pickup 1 irradiates a light beam to a compact disk 3 as a recording medium which is rotated by a spindle motor 2. In this instance, the pickup 1 receives the reflected light from the compact disk 3 and generates a read signal having a signal level according to the amount of light reception. A head amplifier 4 amplifies the read signal to a desired level and supplies a resultant amplification read signal to a waveform equalizing circuit 5.

The waveform equalizing circuit 5 executes waveform compensation an the amplification read signal by frequency characteristics for emphasizing a predetermined high frequency band of the amplification read signal and supplies the resultant signal to a comparator 6. Namely, the waveform equalizing circuit 5 increases an amplitude of the high frequency component in order to compensate a reduction of the amplitude in the high frequency component of the read signal which occurs in an optical reproducing system of the CD player. In the reproduction of the optical disk, although an amplitude reduction amount generally enlarges as a recording density of the optical disk rises, it is sufficient to use a fixed gain characteristic of a high frequency band in the waveform equalizing circuit 5 because the data is recorded at an almost constant recording density on the compact disk 3.

The comparator 6 compares the signal level of the read signal which has been waveform compensated by the waveform equalizing circuit 5 with a predetermined reference voltage and generates a binary signal according to the comparison result. A clock generating circuit 7 generates a clock signal whose phase is synchronized with a signal edge of the binary signal and supplies it to a sampling circuit 8. The sampling circuit 8 samples the binary signal at a timing according to the clock signal and sequentially generates the sampled values as reproduced digital signals.

In the CD player mentioned above, by using the waveform equalizing circuit 5, the high frequency characteristics of the read signal are compensated for thereby improving information reading precision.

In recent years, a DVD (Digital Video Disk) in which not only a digital audio signal but also a digital video signal are recorded onto a recording disk of a compact size at a high density has been proposed.

In an SD system (Super Density disk system) as one system of such a DVD, the use of a plurality of kinds of recording disks having different recording densities has been proposed. As a recording information reproducing apparatus corresponding to the SD system, it is desired that the reproducing operation can be performed for any one of a plurality of kinds of recording disks having different recording densities.

As mentioned above, however, since an amplitude reduction amount of the high frequency band in the read signal differs in accordance with the recording density of the recording disk as a target for reproduction, even if the waveform equalizing circuit 5 as shown in FIG. 1 is applied to the recording information reproducing apparatus corresponding to the SD system, a proper waveform compensation corresponding to all kinds is not performed, so that there arises a problem that the digital signal cannot be reproduced at high accuracy.

OBJECTS AND SUMMARY OF THE INVENTION

The invention is made to solve the above problems and it is an object of the invention to provide a recording information reproducing apparatus which can accurately reproduce a digital signal from any one of a plurality of kinds of recording disks of different recording densities.

According to the first aspect of the invention, there is provided a recording information reproducing apparatus for reproducing a digital signal from a recording medium on which the digital signal is recorded, comprising: reading means for reading recording information from the recording medium and obtaining a read signal; waveform equalizing means for performing a waveform compensation of the read signal by increasing an amplitude of a high frequency component of the read signal by a gain according to an equalization coefficient; decoding means for decoding the digital signal from the signal which has been waveform compensated by the waveform equalizing means; and equalization coefficient setting means for discriminating a recording density of the recording medium on the basis of the digital signal and forming the equalization coefficient having a value according to the recording density which has been discriminated.

According to the second aspect of the invention, there is provided a recording information reproducing apparatus for reproducing a digital signal from a recording medium on which the digital signal is recorded, comprising: reading means for reading recording information from the recording medium and obtaining a read signal; equalization coefficient setting means for discriminating a recording density of the recording medium on the basis of the read signal and forming an equalization coefficient of a value according to the recording density which has been discriminated; waveform equalizing means for performing a waveform compensation of the read signal by increasing an amplitude of a high frequency component of the read signal by a gain according to a value of the equalization coefficient; and decoding means for decoding the digital signal from the signal which has been waveform compensated by the waveform equalizing means.

The recording density of the recording medium as a target for reproduction is detected and the amplitude of the high frequency component of the read signal which has been read from the recording medium is increased by the gain according to the recording density which has been detected.

BRIEF DESCRIPTION OF THE DRAWINGS

FIG. 10 is a diagram showing an example of an internal construction of an equalization coefficient setting circuit 26.

DETAILED DESCRIPTION OF THE PREFERRED EMBODIMENTS

An embodiment of the invention will now be described in detail hereinafter with reference to the drawings.

Figure 1:
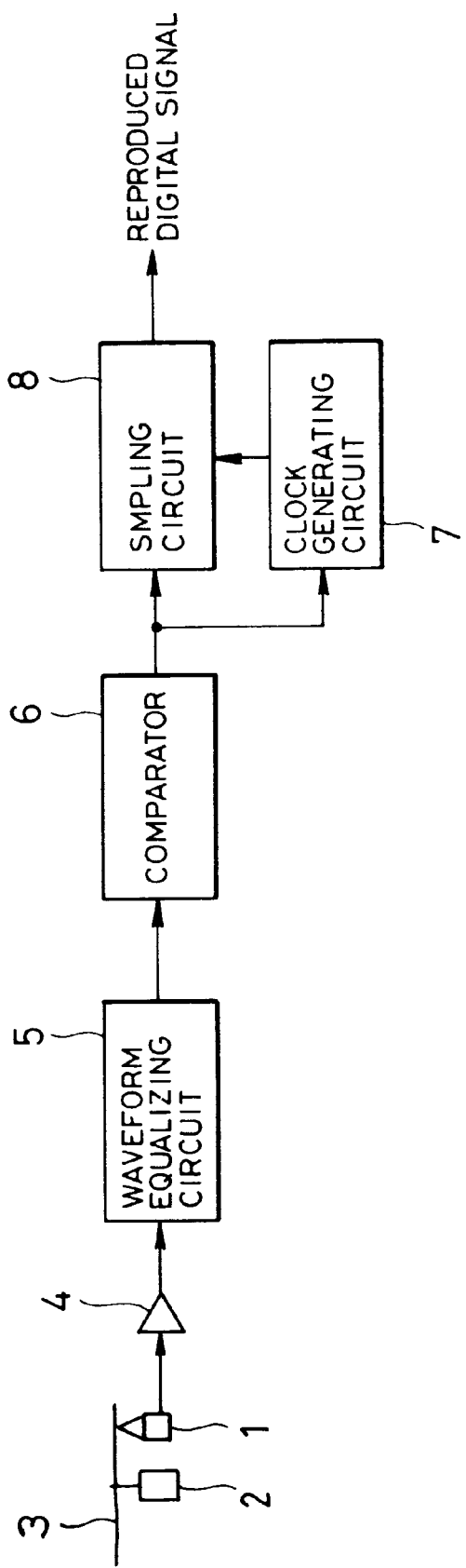
FIG. 1 is a diagram showing a schematic construction of a CD player.
Figure 2:
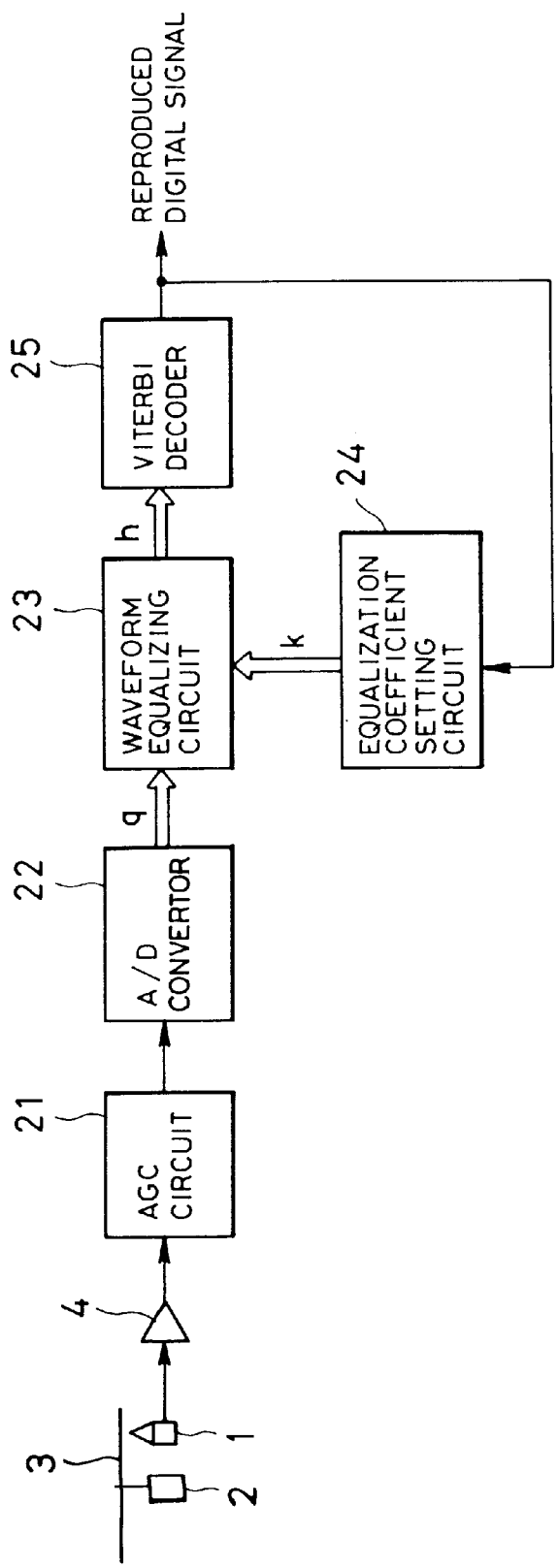
FIG. 2 is a diagram showing an example of a construction of a recording information reproducing apparatus corresponding to an SD system according to the invention.

FIG. 2 is a diagram showing an example of a construction of a recording information reproducing apparatus corresponding to the SD system according to the invention.

In FIG. 2, the pickup 1 irradiates the light beam to the SD (Super Density) disk 3 as a recording medium which is rotated by the spindle motor 2. In this instance, the pickup 1 receives the reflected light from the SD disk 3 and generates the read signal having the signal level corresponding to the light reception amount. The head amplifier 4 amplifies the read signal to a desired level and supplies the resultant amplification read signal to an AGC (Automatic Gain Control) circuit 21. The AGC circuit 21 detects the maximum amplitude level of the amplification read signal and performs a level adjustment in the whole band of the amplification read signal by the gain such as to equalize the maximum amplitude level to a predetermined reference level. The AGC circuit 21 supplies the level-adjusted adjustment read signal to an A/D converter 22. The A/D converter 22 samples the adjustment read signal every predetermined sampling timing and converts into digital sample values q each consisting of, for example, eight bits and supplies them to a waveform equalizing circuit 23. Namely, the sample values q corresponding to the signal level of the read signal are sequentially supplied to the waveform equalizing circuit 23.

The waveform equalizing circuit 23 forms waveform compensation sample values h in which the value of each sample value q is adjusted so as to largely increase the amplitude in the sample value sequence as a frequency when the value of each sample value q changes from the rising tendency to the falling tendency or from the falling tendency to the rising tendency is high. In this instance, an increase amount of the amplitude corresponds to an equalization coefficient k which is supplied from an equalization coefficient setting circuit 24, which will be explained hereinafter.

Namely, the waveform equalizing circuit 23 increases the amplitude of the high frequency component of the read signal by the gain corresponding to the equalization coefficient k by the process for the sample value q. In this instance, the waveform compensation sample value h is obtained as a sample value corresponding to the signal in which the amplitude of the high frequency component in the read signal is increased.

Figure 3:
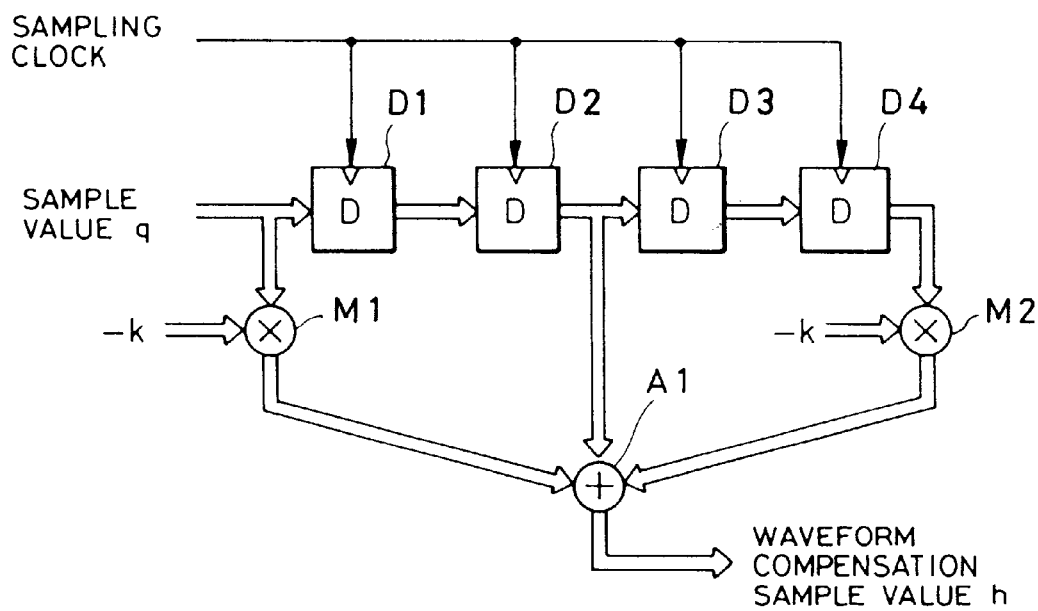
FIG. 3 is a diagram showing an example of an internal construction of a waveform equalizing circuit 23.

FIG. 3 is a diagram showing an example of a circuit in the case where the waveform equalizing circuit 23 is realized by an FIR (Finite Impulse Response) filter.

In FIG. 3, a multiplier M1 supplies the value obtained by multiplying—{equalization coefficient k} to the supplied sample value q to an adder A1. A multiplier M2 supplies to the adder A1 the value obtained by multiplying—{equalization coefficient k} to the sample value q which is delayed by D flip-flops D1 to D4 by a period of four sampling timings and is supplied. The adder A1 generates the addition result, as a waveform compensation sample value h, obtained by adding all of the multiplication results derived by the multipliers M1 and M2 and the sample value q which is delayed by the D flip-flops D1 and D2 by a period of two sampling timings and are supplied.

Figure 4:
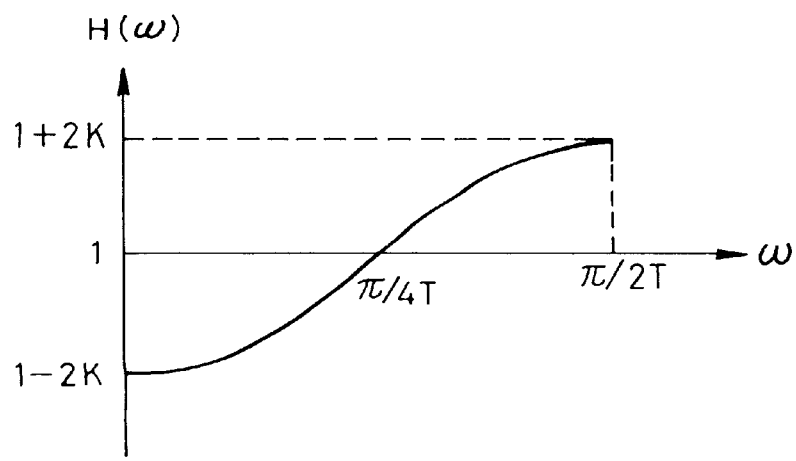
FIG. 4 is a diagram showing characteristics of the waveform equalizing circuit 23.

FIG. 4 is a diagram showing characteristics by the circuit shown in FIG. 3 and its transfer function is shown below.

$$H(\omega) = 1 - 2 \cdot k \cdot \cos(2\omega T)$$

where $H(\omega)$ represents the transfer function:
- $\omega$ represents the angular frequency; and
- T represents the clock period.

Namely, the circuit shown in FIG. 3 is what is called a cosine equalizer showing an impulse response of (-k, 0, 1, 0, -k). As a change frequency of the sample value q which is sequentially inputted rises, an amplitude of the sequence by the waveform compensation sample value h increases. In this instance, as shown in FIG. 4, an amplitude increase amount is determined in accordance with the equalization coefficient k which is supplied from the equalization coefficient setting circuit 24.

Figures 5A, 5B, 6:
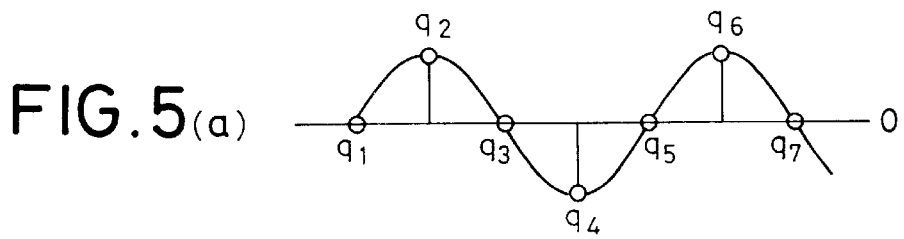
FIGS. 5(a) and 5(b) are diagrams for comparing a sequence of sample values q and a sequence of waveform compensation sample values h.
FIG. 6 is a diagram showing a correspondence relation between the kind of SD disk and equalization coefficients k.

For example, in the case where a sample value sequence consisting of sample values $q_1$ to $q_7$ as shown in FIG. 5(a) is supplied from the A/D converter 22, the waveform equalizing circuit 23 forms waveform compensation sample values $h_1$ to $h_7$ as shown in FIG. 5(b) such as to increase an amplitude of a sequence of the sample values $q_1$ to $q_7$. The increase amount of the amplitude rises as the value of the equalization coefficient k which is supplied from the equalization coefficient setting circuit 24 increases.

A Viterbi decoder 25 captures the waveform compensation sample values h as a continuous time sequence, obtains a decoding data sequence of the highest existence probability for the sample value sequence, and generates such a decoding data sequence as a reproduction digital signal.

The equalization coefficient setting circuit 24 extracts a disk discrimination signal which has been recorded in a lead-in area of the SD disk 3 and indicates the kind of SD disk from the reproduction digital signal and supplies the equalization coefficient k according to the disk discrimination signal to the foregoing waveform equalizing circuit 23.

FIG. 6 is a diagram showing the correspondence relation between the kind of SD disk corresponding to the SD system and the equalization coefficient k which is set by the equalization coefficient setting circuit 24 in accordance with the kind of SD disk.

In case of SD-5 as an SD disk, information is recorded onto only one side of the disk and its information recording density is equal to 5.0 GB (gigabytes). In case of an SD-10 disk, information can be recorded on both sides of the disk and an information recording density per side is set to 5.0 GB. In case of an SD-9 disk, a disk recording layer has a double-layer structure on one side and an information recording density per layer is set to 4.5 GB. In case of an SD-18 disk, a disk recording layer has a 4-layer structure for both sides each consisting of double layers and an information recording density per layer is equal to 4.5 GB. An SD-R disk is a DVD in which information can be written only once and an information recording density per side is set to 4.0 GB or less. Lastly, an SD-RAM disk is rewritable DVD in which information can be rewritten many times and an information recording density per side is set to 2.6 GB.

The equalization coefficient setting circuit 24 first discriminates to which one of the SD disks shown in FIG. 6 the SD disk 3 as a target for reproduction at present corresponds on the basis of the disk discrimination signal.

When it is judged that the SD disk 3 as a target for reproduction at present is the SD-RAM, the equalization coefficient setting circuit 24 forms an equalization coefficient $k_1$ of the equalization coefficient value according to the information recording density 2.6 GB and supplies it to the waveform equalizing circuit 23. When it is judged that the SD disk 3 as a target for reproduction at present is the SD-R, the equalization coefficient setting circuit 24 forms an equalization coefficient $k_2$ of the equalization coefficient value according to the information recording density 4.0 GB and supplies it to the waveform equalizing circuit 23. When it is judged that the SD disk 3 as a target for reproduction at present is the SD-9 or SD-18, the equalization coefficient setting circuit 24 forms an equalization coefficient $k_3$ of the equalization coefficient value according to the information recording density 4.5 GB and supplies it to the waveform equalizing circuit 23. When it is judged that the SD disk 3 as a target for reproduction at present is the SD-5 or SD-10, the equalization coefficient setting circuit 24 forms an equalization coefficient $k_4$ of the equalization coefficient value according to the information recording density 5.0 GB and supplies it to the waveform equalizing circuit 23.

In this instance, there are the following relations among the equalization coefficients $k_1$ to $k_4$ in accordance with the information recording densities.

$k_4 > k_3 > k_2 > k_1$

Namely, by discriminating the kind of SD disk 3 as a target for reproduction at present, the equalization coefficient setting circuit 24 discriminates the information recording density of the disk 3. When the information recording density is high, the equalization coefficient of a large value is supplied to the waveform equalizing circuit 23. When the information recording density is low, the equalization coefficient of a small value is supplied to the waveform equalizing circuit 23.

Therefore, when the SD disk such as SD-5 or SD-10 with the high information recording density is a target for reproduction, the waveform equalizing circuit 23 forms the waveform compensation sample value h such as to remarkably increase the amplitude of the sample value sequence. When the SD disk such as SD-R or SD-RAM with the low information recording density is a target for reproduction, the waveform equalizing circuit 23 forms the waveform compensation sample value h such as to slightly increase the amplitude of the sample value sequence.

According to such an operation, since the SD disk of the high recording density is a reproduction target, in the case where the amplitude of the high frequency band of the read signal that is read out from the recording disk is remarkably attenuated, the waveform compensation such as to extremely increase the amplitude of the read signal is executed. In the case where the SD disk of a relatively low recording density is a reproduction target, since the amplitude of the high frequency band of the read signal that is read out from the recording disk doesn't largely decrease, the waveform compensation such as to increase the amplitude by a very small amount is executed.

As mentioned above, in the recording information reproducing apparatus, by discriminating the kind of SD disk as a reproduction target, the information recording density in the disk is judged. The amplitude of the high frequency component in the read signal is increased by the gain according to the recording density. According to such a construction, a proper waveform compensation according to the recording density is performed to the read signal read out from any one of a plurality of kinds of SD disks of different recording densities.

In the equalization coefficient setting circuit 24, the disk discrimination signal is extracted from the reproduction digital signal. The kind of SD disk 3 is judged on the basis of the disk discrimination signal. The invention, however, is not limited to such a construction.

For example, it is also possible to extract a sync signal from the reproduction digital signal and to judge the kind of disk on the basis of a pattern or period of the sync signal. It is also possible to construct in a manner such that the SD disk 3 is enclosed into an outer casing cartridge called a caddy and the presence or absence or a shape of a detection hole provided in the caddy is discriminated, thereby judging the kind of disk. Further, it is also possible to construct in a manner such that some disk discrimination pattern is provided for a label portion of the SD disk 3 and the disk discrimination pattern is recognized, thereby judging the kind of disk.

In the above embodiment, although the circuit example of the waveform equalizing circuit 23 and its characteristics have been shown in FIGS. 3 and 4, respectively, in such a circuit as shown in FIG. 3, a CD gain changes in accordance with the value of the equalization coefficient k as also shown in FIG. 4. The maximum amplitude in the waveform compensation sample value h sequence, consequently, also changes in accordance with the value of the equalization coefficient k. There occurs a possibility such that a decoding performance of the Viterbi decoder 25 deteriorates due to a change in maximum amplitude.

Figure 7:
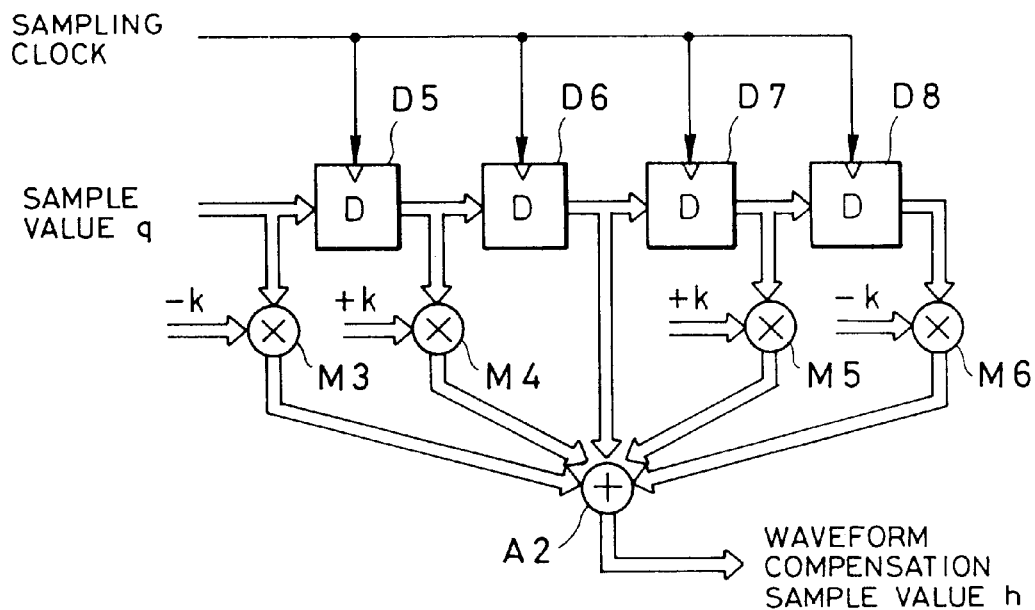
FIG. 7 is a diagram showing an example of another internal construction of the waveform equalizing circuit 23.

FIG. 7 is a diagram showing another circuit example of the waveform equalizing circuit 23 which is formed in consideration of the above points.

In FIG. 7, a multiplier M3 supplies the value obtained by multiplying—{equalization coefficient k} to the supplied sample value q to an adder A2. A multiplier M4 supplies the value obtained by multiplying the equalization coefficient k to the sample value q which is delayed by a D flip-flop D5 by a period of one sampling timing and is supplied to the adder A2. A multiplier M5 supplies the value obtained by multiplying the equalization coefficient k to the sample value q which is delayed by D flip-flops D5 to D7 by a period of three sampling timings and is supplied to the adder A2. A multiplier M6 supplies the value obtained by multiplying—{equalization coefficient k} to the sample value q which is delayed by D flip-flops D5 to D8 by a period of four sampling timings and is supplied to the adder A2. The adder A2 generates the addition result, as a waveform compensation sample value h, obtained by adding all of the multiplication results derived by the multipliers M3 to M6 and the value supplied from the D flip-flop D6.

Figure 8:
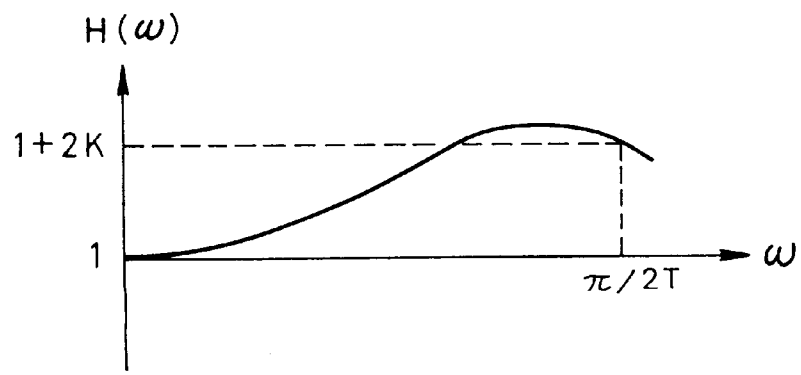
FIG. 8 is a diagram showing characteristics of the waveform equalizing circuit 23 with another internal construction.

FIG. 8 is a diagram showing characteristics by the circuit shown in FIG. 7. A transfer function is shown below.

$H(\omega) = 1 + 2 \cdot k \cdot \cos(\omega T) - 2 \cdot k \cdot \cos(2\omega T)$ where $H(\omega)$ represents the transfer function;
$\omega$ represents the angular frequency; and
T represents the clock period.

As shown in FIG. 8, by using the circuit shown in FIG. 7 as a waveform equalizing circuit 23, since a DC gain is a fixed value irrespective of the value of k, the maximum amplitude in the waveform compensation sample value h sequence doesn't change and the deterioration of the decoding performance of the Viterbi decoder 25 can be avoided.

In the equalization coefficient setting circuit 24 in the embodiment, the disk discrimination signal recorded in the lead-in area of the SD disk is read out and the kind of SD disk as a reproduction target at present is discriminated, thereby supplying the equalization coefficient k according to the recording density to the waveform equalizing circuit 23. The invention, however, is not limited to the above construction.

For example, a recording density discrimination signal indicative of the recording density of the SD disk is recorded in the lead-in area of the SD disk, the recording density discrimination signal is read out from a reproduction digital signal by the equalization coefficient setting circuit 24, and the equalization coefficient k corresponding to the recording density discrimination signal is supplied to the waveform equalizing circuit 23. Namely, in the reproduction of the optical disk, generally, as the recording density in the recording track direction called a linear density rises, the reduction amount of the amplitude of the high frequency component increases. For example, therefore, it is sufficient to express the linear density by using a track length d ($\mu$m/bit) per bit of the recording information and to record the recording density discrimination signal according to the value of d.

In the equalization coefficient setting circuit 24 shown in FIG. 2, the recording density of the SD disk 3 is discriminated on the basis of the reproduction digital signal decoded by the Viterbi decoder 25. The recording density, however, can be also discriminated on the basis of the sample value q which is supplied from the A/D converter 22.

Figure 9:
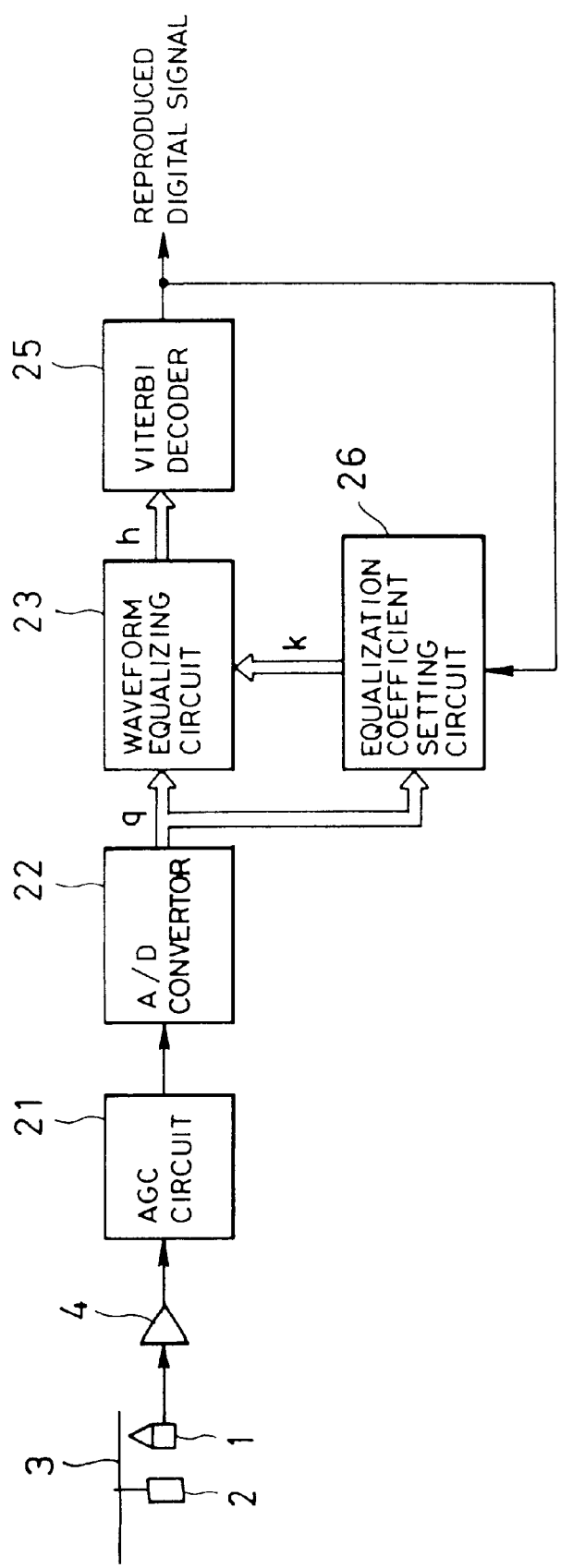
FIG. 9 is a diagram showing a construction of a recording information reproducing apparatus according to another embodiment of the invention.

FIG. 9 is a diagram showing a construction of a recording information reproducing apparatus according to another embodiment of the invention which has been devised in consideration of the above points.

In the construction shown in FIG. 9, since the component elements other than an equalization coefficient setting circuit 26 have the same construction as shown in FIG. 2, only the operation of the equalization coefficient setting circuit 26 will now be described hereinafter.

FIG. 10 is a diagram showing an example of an internal construction of the equalization coefficient setting circuit 26.

In FIG. 10, a long run length detecting circuit 261 and an amplitude detecting circuit 262 detect a sample value sequence of a long run length from the sequence by the sample values q which are sequentially supplied from the A/D converter 22, obtain an amplitude value in the sample value sequence, and supply it to a subtracter 263. A short run length detecting circuit 264 and an amplitude detecting circuit 265 detect a sample value sequence of a short run length from the sequence by the sample values q which are sequentially supplied from the A/D converter 22, obtain an amplitude value in the sample value sequence, and supply it to the subtracter 263. The subtracter 263 obtains a difference between the amplitude values supplied from the amplitude detecting circuits 262 and 265 and supplies it to a coefficient encoding circuit 266. The coefficient encoding circuit 266 encodes the equalization coefficient k according to the difference between the amplitude values and supplies it to the waveform equalizing circuit 23.

Namely, the equalization coefficient setting circuit 26 obtains the difference between the amplitudes of the high frequency signal and low frequency signal in the read signal on the basis of the sample value q which is supplied from the A/D converter 22, thereby discriminating the recording density of the SD disk 3.

It is also possible to employ such a construction that a predetermined fixed high frequency signal and a predetermined fixed low frequency signal are recorded in the lead-in area of the SD disk 3, the fixed high and low frequency signals are read out by the equalization coefficient setting circuit 26, and the equalization coefficient k is formed on the basis of a difference between amplitudes of both of those signals.

Namely, as the recording density rises, the amplitude of the high frequency signal in the read signal remarkably decreases. Since the amplitude of the low frequency signal, however, doesn't largely decrease, by obtaining a difference between the amplitudes of both of those signals, such a difference can become information indicative of the recording density.

Even in the waveform equalizing circuit 23 of the recording information reproducing apparatus shown in FIG. 9, it will be readily understood that by using the circuit in which the DC gain is constant as shown in FIG. 7, the deterioration of the decoding performance of the Viterbi decoder 25 can be prevented.

In the recording information reproducing apparatus according to the invention as mentioned above, the recording density of the recording medium as a reproduction target is detected and the amplitude of the high frequency component in the read signal read out from the recording medium is increased by the gain according to the recording density detected.

Therefore, in the case of the above described construction according to the present invention, there is a significant advantage that the digital signal can be accurately reproduced from any one of the plurality of kinds of SD disks of different recording densities since the proper waveform compensation according to the recording density of the recording medium as a reproduction target is performed.

What is claimed is:

1. A recording information reproducing apparatus for reproducing a digital signal from a recording medium on which the digital signal is recorded, comprising:

reading means for reading recording information from said recording medium to obtain a read signal;

recording density discriminating means for discriminating a recording density of said recording medium on the basis of said read signal;

equalization coefficient setting means for generating an equalization coefficient based on the recording density discriminated;

waveform equalizing means for compensating said read signal by increasing an amplitude of a high frequency component of said read signal by a gain based on the value of said equalization coefficient; and decoding means for decoding said digital signal from the compensated read signal, wherein said recording density discriminating means extracts a predetermined high frequency signal and a predetermined low frequency signal from said read signal, respectively, and obtains a difference between amplitudes of both of said signals, thereby discriminating said recording density on the basis of said amplitude difference.

2. An apparatus according to claim 1, wherein said predetermined high frequency signal and predetermined low frequency signal are recorded in a lead-in area of said optical disk.

3. An apparatus according to claim 1, wherein the recording information reproducing apparatus is adapted to reproduce any one of a plurality of optical disks, each of which has a different recording density.

4. A recording information reproducing apparatus for reproducing a digital signal from a recording medium on which the digital signal is recorded, comprising:

reading means for reading recording information from said recording medium to obtain a read signal;

recording density discriminating means for discriminating a recording density of said recording medium on the basis of said read signal;

equalization coefficient setting means for generating an equalization coefficient based on the recording density discriminated;

waveform equalizing means for compensating said read signal by increasing an amplitude of a high frequency component of said read signal by a gain based on the value of said equalization coefficient; and decoding means for decoding said digital signal from the compensated read signal, wherein a predetermined fixed high frequency signal and a predetermined fixed low frequency signal are recorded on said recording medium, and said recording density discriminating means extracts said fixed high and low frequency signals from said read signal, respectively, and obtains a difference between amplitudes of both of said signals, thereby discriminating said recording density on the basis of said amplitude difference.

5. An apparatus according to claim 4, wherein said predetermined fixed high frequency signal and predetermined fixed low frequency signal are recorded in a lead-in area of said optical disk.

6. An apparatus according to claim 4, wherein the recording information reproducing apparatus is adapted to reproduce any one of a plurality of optical disks, each of which has a different recording density.

7. A recording information reproducing apparatus for reproducing a digital signal from an optical disk on which the digital signal is recorded together with a digital code indicating a recording density of said optical disk, comprising:

reading means for reading recording information from said optical disk to obtain a read signal;

waveform equalizing means for compensating said read signal by increasing an amplitude of a high frequency component of said read signal by a gain based on an equalization coefficient;

decoding means for decoding said digital signal from the compensated read signal;

recording density discriminating means for discriminating a recording density of said optical disk on the basis of said digital code extracted from said digital signal; and equalization coefficient setting means for generating said equalization coefficient based on said recording density.

8. An apparatus according to claim 7, wherein said digital code is recorded in a lead-in area of said optical disk.

9. An apparatus according to claim 7, wherein the recording information reproducing apparatus is adapted to reproduce any one of a plurality of optical disks, each of which having a different recording density.

\* \* \* \* \*